United States Patent
Avramidis

[15] 3,661,025
[45] May 9, 1972

[54] SILENT CHAIN AND METHOD OF ASSEMBLY THEREOF

[72] Inventor: Stellios Antony Avramidis, Greenfield, Ind.

[73] Assignee: FMC Corporation, San Jose, Calif.

[22] Filed: May 25, 1970

[21] Appl. No.: 40,030

[52] U.S. Cl. ..........................................................74/245 S
[51] Int. Cl. ...............................................................F16g 13/02
[58] Field of Search ..........................................74/245 S, 255

[56] References Cited

UNITED STATES PATENTS

| | | | |
|---|---|---|---|
| 2,047,833 | 7/1936 | Pierce | 74/255 S X |
| 953,429 | 3/1910 | Morse | 74/255 S |
| 1,027,002 | 5/1912 | Richmond | 74/255 S |
| 1,306,078 | 6/1919 | Renold et al | 74/255 S |
| 1,743,500 | 1/1930 | Sturtevant | 74/245 S X |
| 2,101,341 | 12/1937 | Perry | 74/255 S |

Primary Examiner—Leonard H. Gerin
Attorney—F. W. Anderson, C. E. Tripp and J. F. Verhoeven

[57] ABSTRACT

A silent chain is disclosed in which sets of intermeshing links are connected together by means of pins received in front and rear openings in the links between two segmental bushings. Each segmental bushing is rigidly secured in the openings of one of the sets of links to form an inflexible link and bushing unit. Adjacent rigid link and bushing units pivot on each pin to provide flexibility of the chain without play or wear between the bushing segments and the links.

4 Claims, 5 Drawing Figures

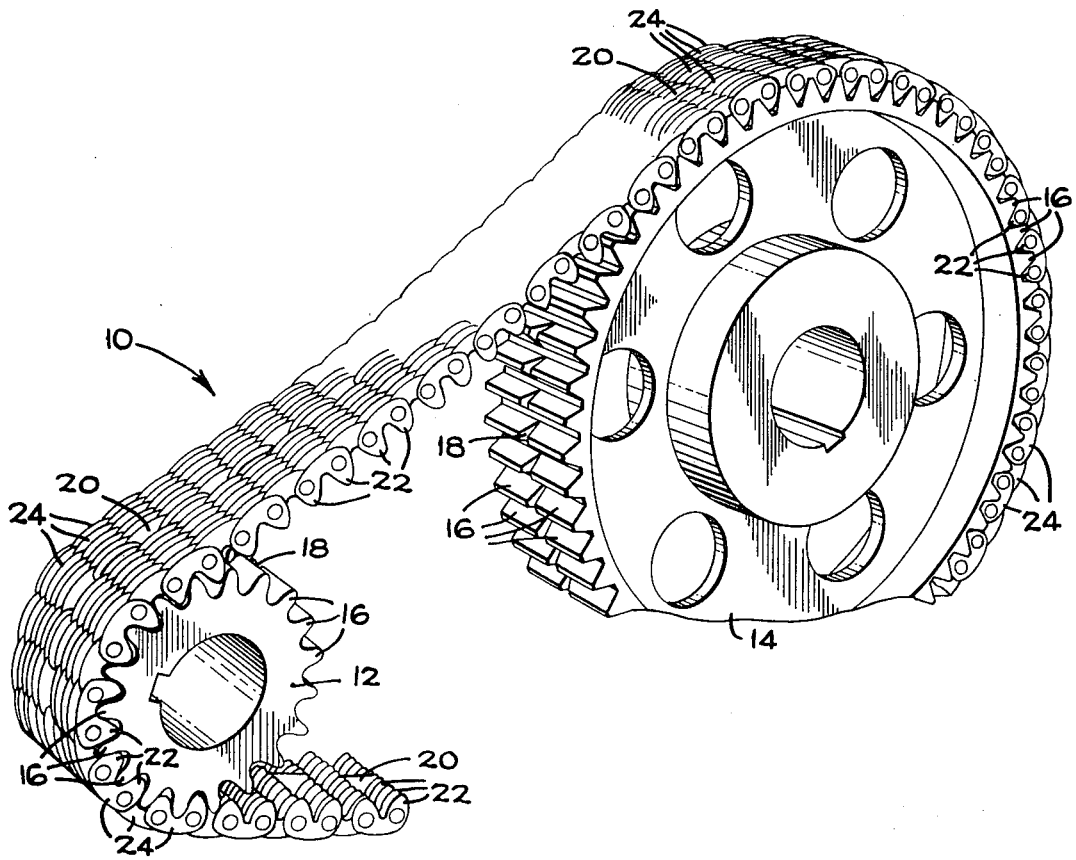
FIG_1
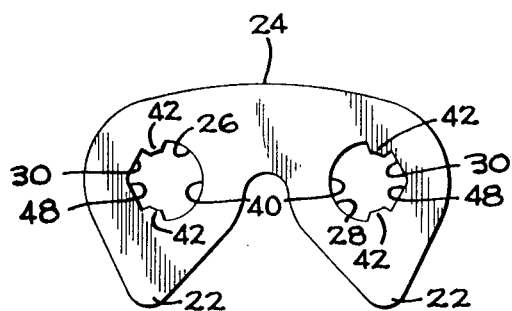
FIG_5
INVENTOR.
STELLIOS ANTONY AVRAMIDIS

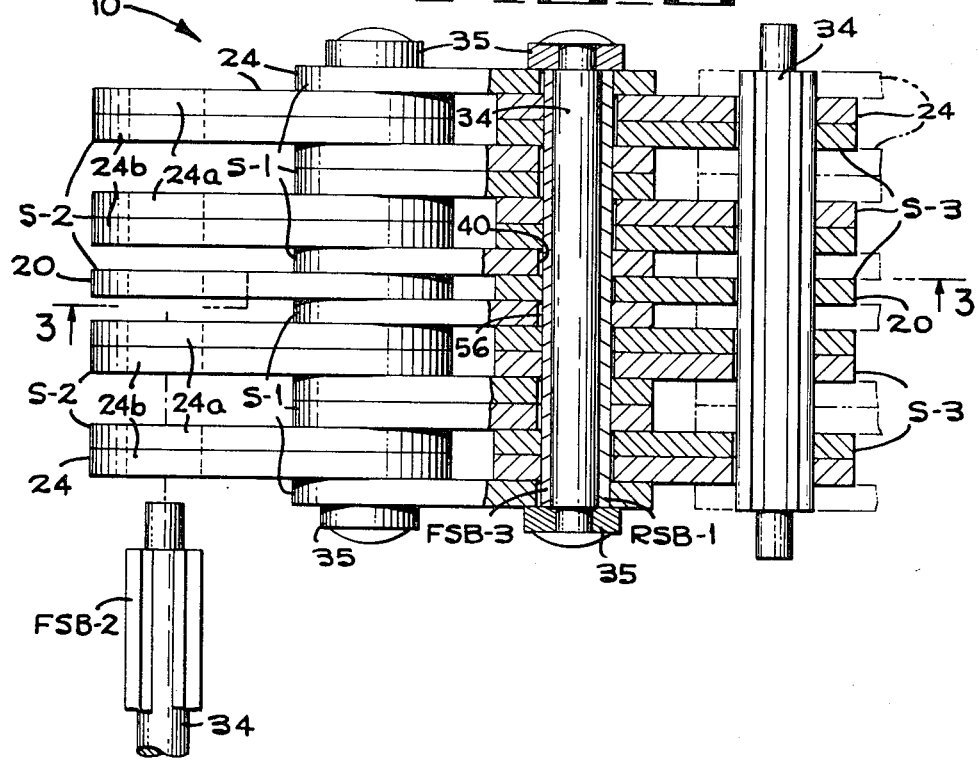
FIG_2
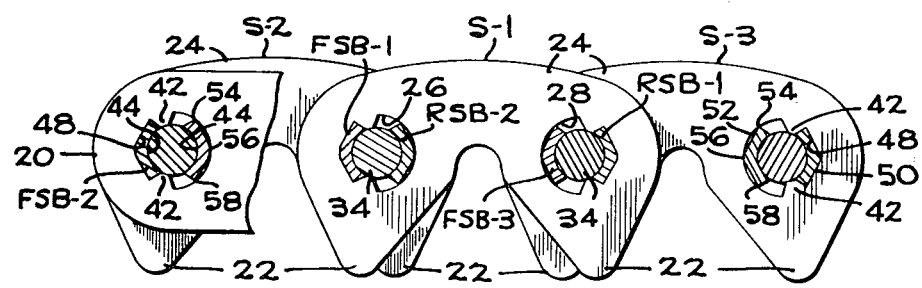
FIG_3
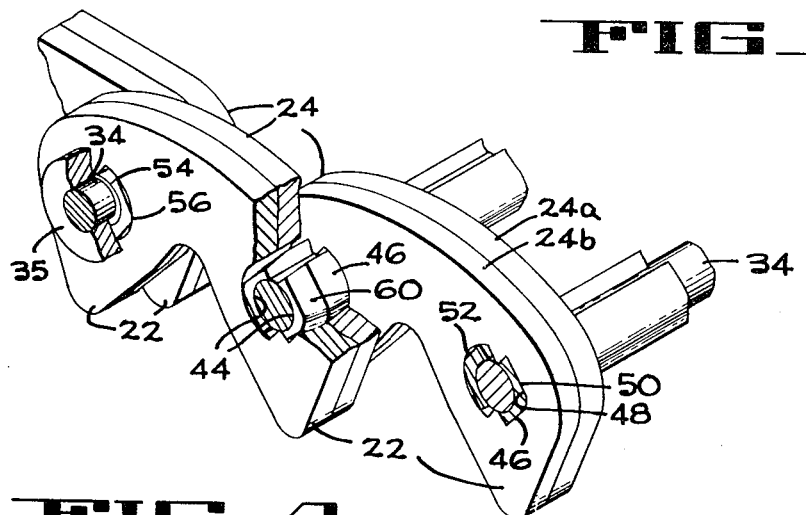
FIG_4

3,661,025

SILENT CHAIN AND METHOD OF ASSEMBLY THEREOF

BACKGROUND OF THE INVENTION

The present invention relates to silent chains and, more particularly, to a construction, and method of assembling, silent chains to reduce play in the chain and thereby reduce wear of elements of the chain.

A typical silent chain is a chain (which may, for example, be an endless drive chain) that is constructed of leaf links having inwardly extending teeth. The chain teeth mesh with the outwardly extending teeth of a sprocket which extends the full width of the chain. The chain links engage the teeth of the sprocket and the inner sides of the links are shaped for this engagement. The links are held together by pins received through front and rear openings in the links, and frequently the pins are received between segmental bushings also received through the link openings as shown in the patent to Oakes, U.S. Pat. No. 1,419,891.

Any play or looseness between the links and the bushings will increase wear on these elements of the chain. This wear, in turn, will increase the looseness between the chain elements. Any significant wear will increase the pitch of the chain and cause an elongation of the chain to impair satisfactory mating of the chain with the sprocket.

SUMMARY OF THE INVENTION

The silent chain of the present invention has reduced play and looseness to minimize wear of the chain elements. In the preferred form of the present invention, each set of links of the silent chain is received in intermeshing relationship with adjacent sets of links of the chain. Each link of each set of links has a front and a rear opening with pockets formed in the outer edge of each opening. A front and a rear segmental bushing are tightly received, respectively, in the front and rear pockets of all the links of a set to form a rigid link and bushing unit. The front segmental bushing also passes through the rear openings of one adjacent set of links and the rear segmental bushing passes through the front openings of the other adjacent set of links. Pins are received in the openings between the bushings to couple adjacent rigid link and bushing units together. When tension is applied to the chain, force is transmitted from the pin in the front opening to the front segmental bushing rigidly secured in the link, through the link to the rear segmental bushing rigidly secured in the link, to the pin in the rear opening. With no play or looseness between the link and the two segmental bushings secured therein, a minimum of play is possible between the pins. Thus, the wear of the chain is reduced and the tendency of the chain to elongate is diminished. Tests have indicated that wear of some elements of the chain of the present invention are as much as 50 percent less than chains without rigid link and bushing units.

It is therefore one object of the present invention to provide a silent chain with minimum play therein.

It is another object of the present invention to provide a silent chain with reduced tendency to wear.

It is yet another object of the present invention to provide a silent chain which resists elongation.

BRIEF DESCRIPTION OF THE DRAWINGS

FIG. 1 is a view in perspective of the silent chain of the present invention mounted on a sprocket.

FIG. 2 is a view in plan, with parts broken away, of the chain of FIG. 1.

FIG. 3 is a view taken on the line 3—3 of FIG. 2.

FIG. 4 is a fragmentary view in perspective of adjacent links of the chain of FIG. 1 showing portions of the elements connecting the links together.

FIG. 5 is a side view in elevation of a link to show the front and rear openings therein without the bushings and pins in the openings.

DESCRIPTION OF THE PREFERRED EMBODIMENT

There is shown in FIG. 1 a silent chain, indicated generally at 10, mounted on two spaced sprockets 12 and 14. The sprockets have outwardly extending teeth 16, which, as indicated at 18, are interrupted in the center to receive guide links 20 in the chain. The chain 10, which is endless, has inwardly extending teeth 22 which mesh with the teeth 16 of the sprockets 12 and 14.

The teeth 22 are an integral part of links 24, as shown best in FIG. 3. Some of the links 24 consist of two link sections 24a and 24b which are identical and contiguous in side-by-side relation. Each link has an opening at each end which may, for convenience, be designated a forward opening 26 and a rear opening 28 merely to distinguish between the openings in the description of the invention and not necessarily to indicate the direction of movement of the chain. Each opening has a pocket 30 formed in the outer edge of the opening (that is, the pocket is formed in the forward edge of the forward opening and in the rear edge of the rear opening).

A first set S–1 of links, which are aligned in laterally spaced relation, has a front segmental bushing FSB–1 (FIG. 3) tightly and rigidly secured in the pockets of the front openings in all the links of the set. The set S–1 of links also has a rear segmental bushing RSB–1 tightly and rigidly secured in the pockets of the rear openings in all the links of the set. The segmental bushings are preferably slightly larger than the pockets and pressed therein. When the two segmental bushings are pressed into the pockets of the front and rear openings, respectively, a rigid inflexible link and bushing unit is formed comprising all the links 24 of set S–1 and the bushings FSB–1 and RSB–1.

A second set S–2 of links consists of aligned, laterally spaced apart links 24 identical to the links of set S–1. A rear segmental bushing RSB–2, identical to bushing RSB–1, extends through the front openings in the links of set S–1 and through the rear openings in the links of set S–2. The bushing RSB–2 which is also slightly larger than the pockets of the rear openings of the links of set S–2, is tightly and rigidly pressed into those openings. A front segmental bushing FSB–2 is tightly received in the pocket of the front openings in the set S–2 of links 24. The links of set S–2, and the two bushings RSB–2 and FSB–2 tightly received therein, form a inflexible link and bushing unit. It will be noted that, for convenience, the segmental bushings tightly received in a set of links has been given a digital suffix similar to the digital suffix given to the set of links.

A third set of links S–3 also consists of aligned, laterally spaced apart links 24 identical to the links of sets S–1 and S–2. The front segmental bushing FSB–3 of the set of links S–3 extends through the rear openings of the links of set S–1 and the rear segmental bushing RSB–1 of the set of links S–1 extends through the front openings of the set of links S–3.

The sets S–2 and S–3 of links are interconnected by segmental bushings with other adjacent sets of links in the same manner they are interconnected with the set of links S–1. Additional sets of links are connected seriatim to form the endless chain 10.

The pivotal connection between the inflexible link and bushing units is formed by a pin 34 received in the aligned openings of adjacent sets of links (that is, the front openings of one set of links, such as S–1, and the rear openings of the next forward adjacent set of links S–2) between the segmental bushings of the respective sets of links. At each opening of each link of the set, say the front opening of a link 24 of the set of links S–1, the pin on one side (the forward side of the pin in the forward opening of a link) will be engaged with the forward segmental bushing FSB–1 tightly secured, with no clearance or play, in the pocket of the opening. On the opposite side of the pin (the rear side of the pin in the forward opening of a link) the pin is engaged with the rear segmental bushing RSB–2 of the next forward set of links S–2. The rear surface of the bushing RSB–2 engages, but not tightly, the rear surface of the forward opening in the link of set S–1. The pin, at each end, is of reduced diameter and extends through washers 35. The ends of the pins are peened over the washers to hold the pin in the links.

In each link 24, the edge 40 of each opening opposite the pocket 30 is semi-circular with a radius larger than the radius of the pin to permit receipt of the segmental bushing between said edge and the pin. Small portions 42 of the inner surface of the openings lie on circles of a radius slightly larger than the radius of the pin. The segmental bushings have a concave inner surface 44 of circular conformation for mating engagement with the pin. The bushings have a rear convex surface 46 in the conformation of a wide V. The pockets have inner surfaces 48 mating tightly with the rear surfaces of the bushings.

Although the rear surfaces of the bushings tightly received in the pockets are pressed against the pocket surfaces, as at 50, the rear surfaces of the bushings received in the link openings opposite the pockets are not tightly pressed against the circular opening edge 40, as at 52, so that pivotal action between adjacent sets of pins can occur. The rear V-shaped surface of the segmental bushing shown to illustrate the present invention has three surfaces 54, 56, and 58 which normally make contact with the edge surface 40 when the chain is unloaded. It should be noted that in FIG. 2 there is shown a clearance, exaggerated for clarity of illustration only, between contact surface 56 and opening surface 40. This clearance, which may be small or nonexistent when the chain is unloaded, is greater when the chain is loaded. Similar clearances occur between the bushing end surfaces 54, 58 and the link opening surface 40. Although a segmental bushing with a V-shaped back has been illustrated, the back could very well be circular, oval, or of other geometrical configuration. At least one end of each bushing is chamfered, as indicated at 60, to facilitate pressing the bushing into the pockets of the links.

When any segment of the chain is under tension during use, the force transmitted through the chain is transmitted through structure with a minimum of play or looseness to keep the wear of the chain at a minimum. Force is transmitted from one pin to a segmental bushing secured rigidly in a pocket 30 in one of the openings of the set of links. From the bushing in the pockets, the force is transmitted through the set of links to the other bushing tightly secured in the pockets of the other openings in said set of links. From this bushing, the force is transmitted directly to the pin.

Although the best mode contemplated for carrying out the present invention has been herein shown and described, it will be apparent that modification and variation may be made without departing from what is regarded to be the subject matter of the invention.

What is claimed is:

1. A silent chain comprising
   1. a plurality of inflexible link and bushing units, each inflexible link and bushing unit comprising
      a. a plurality of links having openings at each end,
      b. a first segmental bushing rigidly secured in each of said openings in one end of the links,
      c. and a second segmental bushing rigidly secured in each of said openings in the other end of the links, the bushings of adjacent link and bushing units received in the openings at each end of the links and the links of adjacent link and bushing units received in intermeshing relationship with the links,
   2. and pins received through the openings and between the segmental bushings of adjacent inflexible link and bushing units to pivotally connect said units together.
2. A silent chain comprising
   1. a first inflexible link and bushing unit comprising
      a. a plurality of links each having a front and rear opening,
      b. a front segmental bushing secured in the front openings of the links and a rear segmental bushing secured in the rear openings of the links to form an inflexible link and bushing unit with the links in spaced relation,
   2. a second inflexible link and bushing unit similar to said first inflexible link and bushing unit,
   3. a pin extending through the rear openings of the links of said second inflexible link and bushing unit and through the front openings of the links of said first inflexible link and bushing unit,
   4. a third inflexible link and bushing unit similar to said first and second inflexible link and bushing unit, the segmental bushing of said third inflexible link and bushing unit extending through the rear openings of said first link and bushing unit,
   5. a pin extending through the front openings of the links of said third inflexible link and bushing unit and through the rear openings of said first inflexible link and bushing unit, and
   6. a plurality of additional inflexible link and bushing units connected seriatim to said second and third inflexible link and bushing units.
3. A silent chain comprising
   1. a first inflexible link and bushing unit comprising
      a. a plurality of links each having a front and rear opening, each opening including a pocket in the outer edge of the opening,
      b. a front segmental bushing rigidly pressed into the pockets of the front opening and a rear segmental bushing rigidly pressed into the pockets of the rear openings, to form an inflexible link and bushing unit with the links in spaced relation,
   2. a second inflexible link and bushing unit similar to said first inflexible link and bushing unit, the rear segmental bushing of said second inflexible link and bushing unit received through the front openings of said first inflexible link and bushing unit and the front segmental bushing of said first inflexible link and bushing unit received through the rear openings of said second inflexible link and bushing unit,
   3. a third inflexible link and bushing unit similar to said first and second inflexible link and bushing unit, the front segmental bushing of said third inflexible link and bushing unit received through the rear openings of said first inflexible link and bushing unit and the rear segmental bushing of said first link and bushing unit received through the front openings of said third inflexible link and bushing unit,
   4. additional inflexible link and bushing units connected, respectively, to said second and third inflexible link and bushing units in series, the links of all of the inflexible link and bushing units including said first, second, and third units received in intermeshing relationship with the links of adjacent units, and
   5. a pin received through each opening between the segmental bushings therein to pivotally connect adjacent inflexible link and bushing units.
4. A silent chain comprising a plurality of sets of aligned links, each set having a segmental bushing rigidly secured in each end to form with said set an inflexible link and bushing unit, each segmental bushing of each unit receiving links of an adjacent unit thereon, and a pin received between the segmental bushings of adjacent units to form a pivotal connection between the inflexible link and bushing units.

* * * * *